(12) United States Patent
Kulkarni et al.

(10) Patent No.: US 12,505,408 B2
(45) Date of Patent: Dec. 23, 2025

(54) SYSTEM AND A METHOD FOR OPTIMIZING SPRINT-BASED TASKS IN AGILE METHODOLOGY

(71) Applicant: Cognizant Technology Solutions India Pvt. Ltd., Chennai (IN)

(72) Inventors: Dattaprasad Kulkarni, Pune (IT); Hemant Patil, Pune (IN); Rajeswari Kumaran, Chennai (IN); Shikha Grover, Noida (IN); Lucky Singh, Bhopal (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 210 days.

(21) Appl. No.: 18/212,385

(22) Filed: Jun. 21, 2023

(65) Prior Publication Data
US 2024/0346447 A1    Oct. 17, 2024

(30) Foreign Application Priority Data
Apr. 11, 2023    (IN) .............................. 202341026871

(51) Int. Cl.
*G06F 8/10*    (2018.01)
*G06F 8/20*    (2018.01)
(Continued)

(52) U.S. Cl.
CPC ..... *G06Q 10/103* (2013.01); *G06Q 10/06311* (2013.01); *G06F 8/71* (2013.01);
(Continued)

(58) Field of Classification Search
CPC ........... G06Q 10/103; G06Q 10/06311; G06Q 10/06313; G06F 11/3688; G06F 11/302; G06F 8/71
See application file for complete search history.

(56) References Cited

U.S. PATENT DOCUMENTS 7,856,616 B2    12/2010    Chang et al.
9,406,038 B2    8/2016    Cantor et al.
(Continued)

OTHER PUBLICATIONS

Defect Prediction in Agile Software Development, International Journal of Scientific & Engineering Research, vol. 6, Issue 2, Feb. 2015 ISSN 2229-5518.
(Continued)

*Primary Examiner* — Anibal Riveracruz
*Assistant Examiner* — Anibal Rivera
(74) *Attorney, Agent, or Firm* — CANTOR COLBURN LLP

(57) ABSTRACT

A system for optimizing sprint-based tasks implemented in an agile methodology, the system including a memory and a processor configured to execute a task optimization engine to receive input data including story point data associated with historical user stories captured during previous sprints, where the input data is analyzed to determine a first feature dataset, where a timeseries dataset is determined for forecasting unplanned task for upcoming sprint based on analysis of the input data associated with unplanned task of the previous sprints and a dataset associated with attributes is determined based on the input data associated with the previous sprints for story point data of an upcoming sprint, and where the datasets are combined to generate a persistent identifier for sprint capacity buffer data values to optimize sprint-based tasks in agile methodology.

38 Claims, 11 Drawing Sheets

(51) Int. Cl.
  *G06F 9/44* (2018.01)
  *G06F 11/30* (2006.01)
  *G06Q 10/06* (2023.01)
  *G06Q 10/0631* (2023.01)
  *G06Q 10/10* (2023.01)
  G06F 8/71 (2018.01)
  G06F 11/3668 (2025.01)

(52) U.S. Cl.
  CPC ........ *G06F 11/302* (2013.01); *G06F 11/3688* (2013.01); *G06Q 10/06313* (2013.01)

(56) References Cited

U.S. PATENT DOCUMENTS

| | | |
|---|---|---|
| 10,001,975 B2 | 6/2018 | Bharthulwar |
| 10,540,573 B1 | 1/2020 | Li et al. |
| 2007/0168918 A1 | 7/2007 | Metherall et al. |
| 2014/0053127 A1* | 2/2014 | Madison .................... G06F 8/30 717/103 |
| 2019/0155722 A1* | 5/2019 | Gupta ................. G06F 11/3688 |
| 2021/0157715 A1 | 5/2021 | Hand et al. |
| 2024/0069870 A1* | 2/2024 | Malik ........................ G06F 8/20 |
| 2025/0232259 A1* | 7/2025 | Vinayaka ....... G06Q 10/063114 |

OTHER PUBLICATIONS

Ednaldo Dilorenzo, Enabling the Reuse of Software Development Assets Through a Taxonomy for User Stories, Received May 2, 2020, accepted May 19, 2020, date of publication Jun. 2, 2020, date of current version Jun. 18, 2020.

Vivian Hu, Predicting the Future with Forecasting and Agile Metrics, San Francisco, Jun. 4, 2020.

Christine Adrian Sigalla, Predicting No. of Software Defects and Defect Remediation Time to Minimize Leakage and Allocate Rework Efforts in an Upcoming Software Releasem, Aug. 31, 2020.

* cited by examiner

SYSTEM AND A METHOD FOR OPTIMIZING SPRINT-BASED TASKS IN AGILE METHODOLOGY

CROSS REFERENCE TO RELATED APPLICATION

This application is related to and claims the benefit of Indian Patent Application number 202341026871 filed on Apr. 11, 2023, the contents of which are herein incorporated by reference in their entirety.

FIELD OF THE INVENTION

The present invention relates generally to the field of sprint-based tasks in agile methodology, and more particularly, the present invention relates to a system and method for optimizing sprint-based tasks in an agile methodology.

BACKGROUND OF THE INVENTION

Typically, agile methodology is followed in software development projects due to advantages of faster and frequent releases compared to traditional waterfall or increment methodology. It has been observed that agile methodology accommodates change in user requirements better than waterfall methodology thereby providing early realization of benefits in the software development projects. Furthermore, this flexibility is fully utilized only if the releases and sprints are planned well and adaptable to changes in scenarios where sprints are defined as a period of time in which a number of tasks are executed.

However, several challenges are faced by teams while implementing fast paced agile methodology. Firstly, there is unfinished work at the end of a sprint that adds onto the next sprint. Also, considerable time is spent on fixing defects in the sprints/projects as the defects are identified and time is accounted for fixing the defects that is difficult to predict and hence difficult to plan for. If carried over, the defects lead to huge defects and backlog functional/technical debt in delivered product. Furthermore, once an iteration is planned in the agile methodology and stories are committed, no changes are supposed to be made to the committed stories during the sprint. However, there are inevitable production fixes, unexpected changes in priority, technical uncertainties or functional novelty that throws planning off track.

Furthermore, teams involved in agile methodology usually run out of time while performing agile tasks. As illustrated in FIG. 2A, a survey carried out across scrum masters in an organisation shows that 90% of leads involved in the agile tasks say that there is a variation of effort for a given story point that denotes aspects of challenges in planning for the sprint. Also, scrum teams carry forward defects to be fixed in later sprints. The graph as illustrated in FIG. 2A denotes that scrum masters spend time to gauge individual member's capabilities. Also, typical Application Lifecycle Management (ALM) tools such as Jira® do not provide any insight towards this.

Further, there are considerable number of projects which have faced sprint timeline issues due to defects and unplanned tasks. FIG. 2A illustrates that 41 percent of the respondents said that carrying forward the defects impacts the timelines. Further, 51 percent of the respondents said that they are getting unplanned task, 28 percent said that they are getting unplanned tasks at times and 21 percent said they get no unplanned task. There are quite a number of uncertainties while delivering in agile mode and unless it is highlighted explicitly, the scrum master does not plan for adequate buffer to deal with uncertainties. This leads to agile projects not delivering on their commitment, time and budget. When user stories are broken into tasks and estimates, developers do not assign time for fixing defects in the project since that is an unknown. FIG. 2B illustrates how effort variation is high in projects where team is not well versed in estimation techniques.

Typically, developers tend to expect minimal defects. Furthermore, as per agile methodology, in some cases, additional work is taken up and one user story is substituted with another during course of the sprint in the agile methodology. In an example, if user stories are blocked due to external dependencies, another user story is picked in its place such that available developer capacity is utilized. Also, if there are project production fixes required based on previous release of the project/software, developers are involved in addressing that. If there is poor prioritization from product owners, there are many such changes in scope during the sprint.

Furthermore, there are stories which are different from what team is used to handling where the stories may be either technical which stories requires complex implementation that team has not done so far or functional stories for brand new features. Therefore, it is necessary for scrum master to know how many such stories are scoped in the current release of the project/software such that team is provided with capacity to deliver even if it is estimated wrong at beginning of the sprint.

Also, depending on experience of a team member in technology or domain, output of the team member varies. Further, teams carry out story point estimations and later breaks down the tasks with effort estimate in hours. Analysis of efforts in hours spent against each type of story pointers provides insights of team's ability to carry out size estimation. Another typical phenomenon is story point drift where the story point drift is when user stories that had a given story point value at the beginning of the project require substantially more or less effort than stories with the same story point value later on in the project for the given amount of effort required to complete the story.

In projects, it is possible that stories which require similar nature of tasks are repeated. In an example, stories relating to implementation of an archival and purging of an entity in database have similar tasks for a different entity each time and as such, the story is repeated. Creating a defect board for a sprint involves manual analysis effort since the defects should be related to the user stories in current sprint so that development and testing effort is optimized. Variation in terms of efforts for a story point is a huge problem for the teams and a number of defects that are caused in the sprint. The defects are uncovered as the teams try to close the sprints so as to move onto next sprint and as such the defects are not fixed or may be partially fixed. Further, during planning of the sprint, it is important to identify who will be deployed to perform the tasks in the sprint, how many sprints will be performed and which all teams will be involved.

Further, it has been observed that even though risks are provided to the scrum master in the beginning itself while performing agile tasks, the teams are not able to complete the committed stories on time. Also, handling of defects or any other uncertainty becomes a problem because when it comes to production fixes, the defects occur at any time and there are no fixes over it therefore typically teams run out of time. Also, the story point is not a standard measure like some other points such as function points because function point is an industrial stand-point and it remains constant in terms of hours. Therefore, story points vary within teams and within the projects as there is no standardisation.

Also, conventionally, there is no mechanism to keep track of what is not complete in previous sprint because the sprint is closed and as such historical data related to the sprints is not taken forward. Also, in a team, skill sets are not uniform as there are seniors and juniors in the team. Conventional ALM tools like Jira®, agile® central do not have capabilities to track capacity of individuals in the team in terms of team performance where the team performance is measured in terms of team velocity. However, the team velocity does not explain contribution of individuals in terms of individual performance to the sprint task. Also, teams have variations in terms of estimation of how much knowledge team has as some members in the team are knowledgeable, few have bit of knowledge, and some have no knowledge at all regarding a sprint task.

In light of the above-mentioned drawbacks, there is a need for a system and a method for optimizing sprint-based tasks in agile methodology. There is a need for identifying data points in previous sprints for optimizing upcoming sprints efficiently. There is a need for an integrated system for optimizing sprint-based tasks implemented in agile methodology.

SUMMARY OF THE INVENTION

In various embodiments of the present invention, a system for optimizing sprint-based tasks implemented in an agile methodology is provided. The system comprises a memory for storing program instructions and a processor executing program instructions stored in the memory and configured to execute a task optimization engine. The task optimization engine is configured to receive input data comprising story point data associated with historical user stories captured during previous sprints wherein the input data is analyzed to determine a first feature dataset. The task optimisation engine is configured to determine a reference threshold value associated with the story point data such that the first feature dataset corresponding to the story point data is in a pre-defined range. The task optimisation engine is configured to determine a second feature dataset from the input data, the second feature dataset comprises data values obtained based on the previous sprints. The task optimisation engine is configured to determine a third feature dataset by analyzing the second feature dataset to determine correlated axis values associated with the data values of the previous sprints to determine defect counts associated with the previous sprints. The task optimisation engine is configured to determine a timeseries dataset for forecasting unplanned task for upcoming sprint based on analysis of the input data associated with unplanned task of the previous sprints. The task optimisation engine is configured to determine a dataset associated with attributes based on the input data associated with the previous sprints for story point data of an upcoming sprint and combine the datasets to generate a persistent identifier for sprint capacity buffer data values to optimize sprint-based tasks in agile methodology.

In various embodiments of the present invention, a method for optimizing sprint-based tasks implemented in an agile methodology is provided. The method comprises steps of receiving input data comprising story point data associated with historical user stories captured during previous sprints, wherein the input data is analyzed to determine a first feature dataset. The method comprises step of determining a reference threshold value associated with the story point data such that the first feature dataset corresponding to the story point data is in a pre-defined range. The method comprises step of determining a second feature dataset from the input data, the second feature dataset comprises data values obtained based on the previous sprints. The method comprises step of determining a third feature dataset by analyzing the second feature dataset to determine correlated axis values associated with the data values of the previous sprints to determine defect counts associated with the previous sprints. The method comprises step of determining a timeseries dataset for forecasting unplanned task for upcoming sprint based on analysis of the input data associated with unplanned task of the previous sprints. The method comprises step of determining a dataset associated with attributes based on the input data associated with the previous sprints for story point data of an upcoming sprint and combining the datasets to generate a persistent identifier for sprint capacity buffer data values to optimize sprint-based tasks in agile methodology.

In various embodiments of the present invention, a computer program product is provided. The computer program product comprises a non-transitory computer-readable medium having computer program code stored thereon, the computer-readable program code comprising instructions that, when executed by a processor, causes the processor to receive input data comprising story point data associated with historical user stories captured during previous sprints, wherein the input data is analyzed to determine a first feature dataset. A reference threshold value associated with the story point data is determined such that the first feature dataset corresponding to the story point data is in a pre-defined range. A second feature dataset is determined from the input data, the second feature dataset comprises data values obtained based on the previous sprints. A third feature dataset is determined by analyzing the second feature dataset to determine correlated axis values associated with the data values of the previous sprints to determine defect counts associated with the previous sprints. A timeseries dataset is determined for forecasting unplanned task for upcoming sprint based on analysis of the input data associated with unplanned task of the previous sprints. A dataset associated with attributes is determined based on the input data associated with the previous sprints for story point data of an upcoming sprint. The datasets are combined to generate a persistent identifier for sprint capacity buffer data values to optimize sprint-based tasks in agile methodology.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
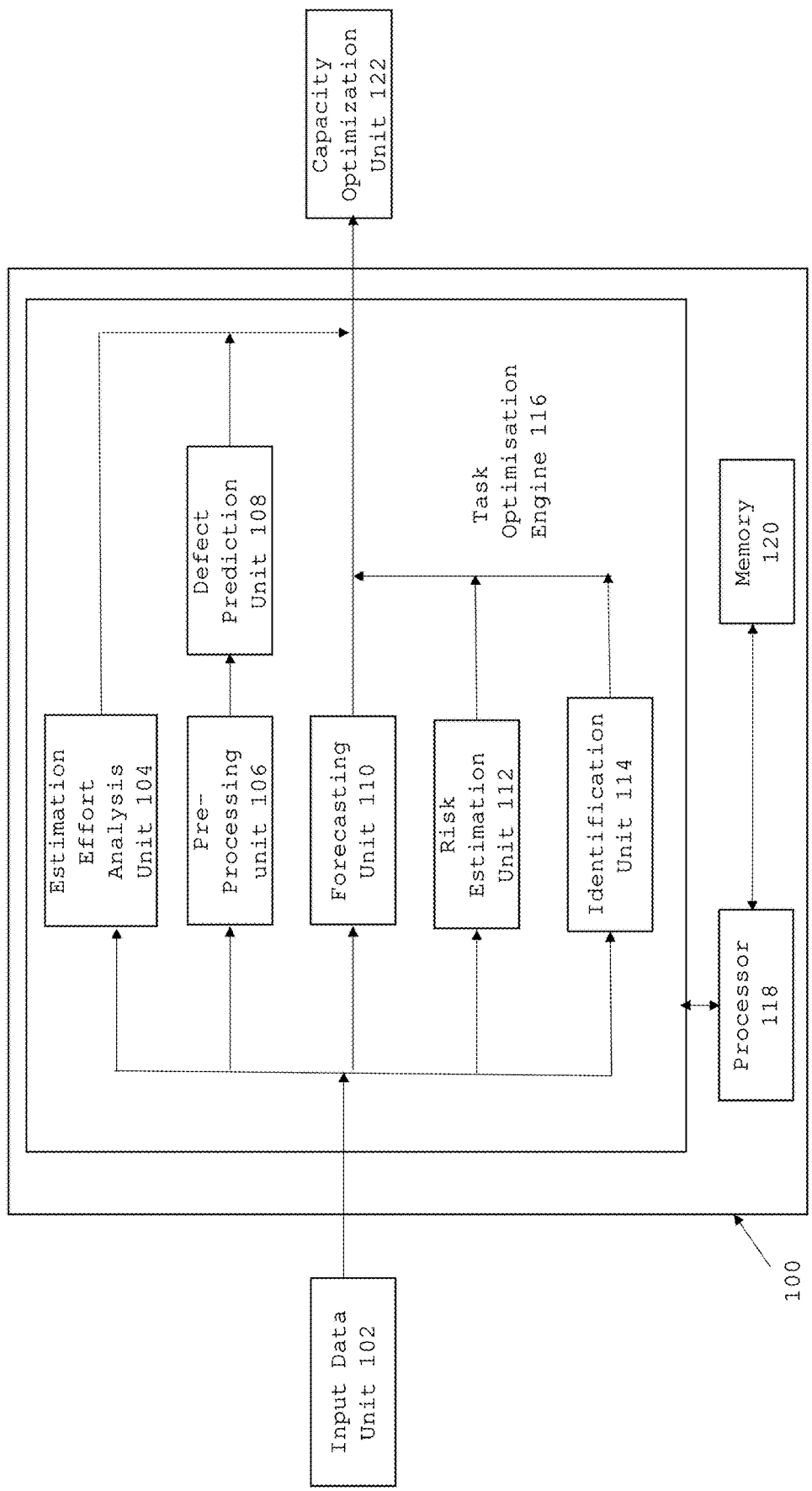
FIG. 1 is a block diagram of a system for optimising sprint planning in agile methodology, in accordance with an embodiment of the present invention.

FIG. 1 is a block diagram of a system 100 for optimising task in agile methodology, in accordance with various embodiments of the present invention. In an embodiment of the present invention, the system 100 comprises an input data unit 102, a task optimisation engine 116 and a capacity optimisation unit 122. The task optimisation engine 116 comprises an estimation effort analysis unit 104, a pre-processing unit 106, a defect prediction unit 108, a forecasting unit 110, a risk estimation unit 112 and an identification unit 114. The components of the task optimisation engine 116 are operated via a processor 118 specifically programmed to execute instructions stored in a memory 120 for executing respective functionalities of the components of the system 100.

In an embodiment of the present invention, the system 100 may be implemented in a cloud computing architecture in which data, applications, services, and other resources are stored and delivered through shared data-centres. In an exemplary embodiment present of the invention, the functionalities of the system 100 are delivered to a user as Software as a Service (Saas) or Platform as a Service (PaaS) over a communication network. The system 100 is a micro-service-based architecture comprising micro-service components which communicate via an Application Programming Interface (API) with the input data unit 102 and the capacity optimization unit 122.

In another embodiment of the present invention, the system 100 may be implemented as a client-server architecture. In an embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server. The server may be located on a public/private cloud or locally on a particular premise.

In an embodiment of the present invention, the estimation effort analysis unit 104 is configured to fetch input data from the input data unit 102 and analyse story point data in the input data to determine a first feature dataset. The first feature dataset includes effort estimate values which are related to effort involved by the teams in the stories being implemented as part of the agile tasks. The input data unit 102 is in communication with one or more Application Lifecycle Management (ALM) tools (not shown) via one or more APIs. The input data comprises of data related to historical user stories captured during previous sprints implemented in the agile methodology by the ALM tools.

In an embodiment of the present invention, the effort estimate values are stored as a first feature data in a database (not shown) linked to the estimation effort analysis unit 104. The story point data in the input data provides insights of tasks that were executed in the past stories. The estimation effort analysis unit 104 is configured to analyse input data relating to tasks implemented in the user stories that represent effort involved in executing the story points and determine inter quartile range (IQR) value, lower/upper boundaries and outliers using the task data. The estimation effort analysis unit 104 is configured to highlight outliers in the story points in terms of effort spent on the story points. In an exemplary embodiment of the present invention, any overlap in IQR value of effort across story points indicates poor story point estimation that is visualised using box plots via a User Interface (UI) linked to the task optimisation engine 116.

Figure 2A:
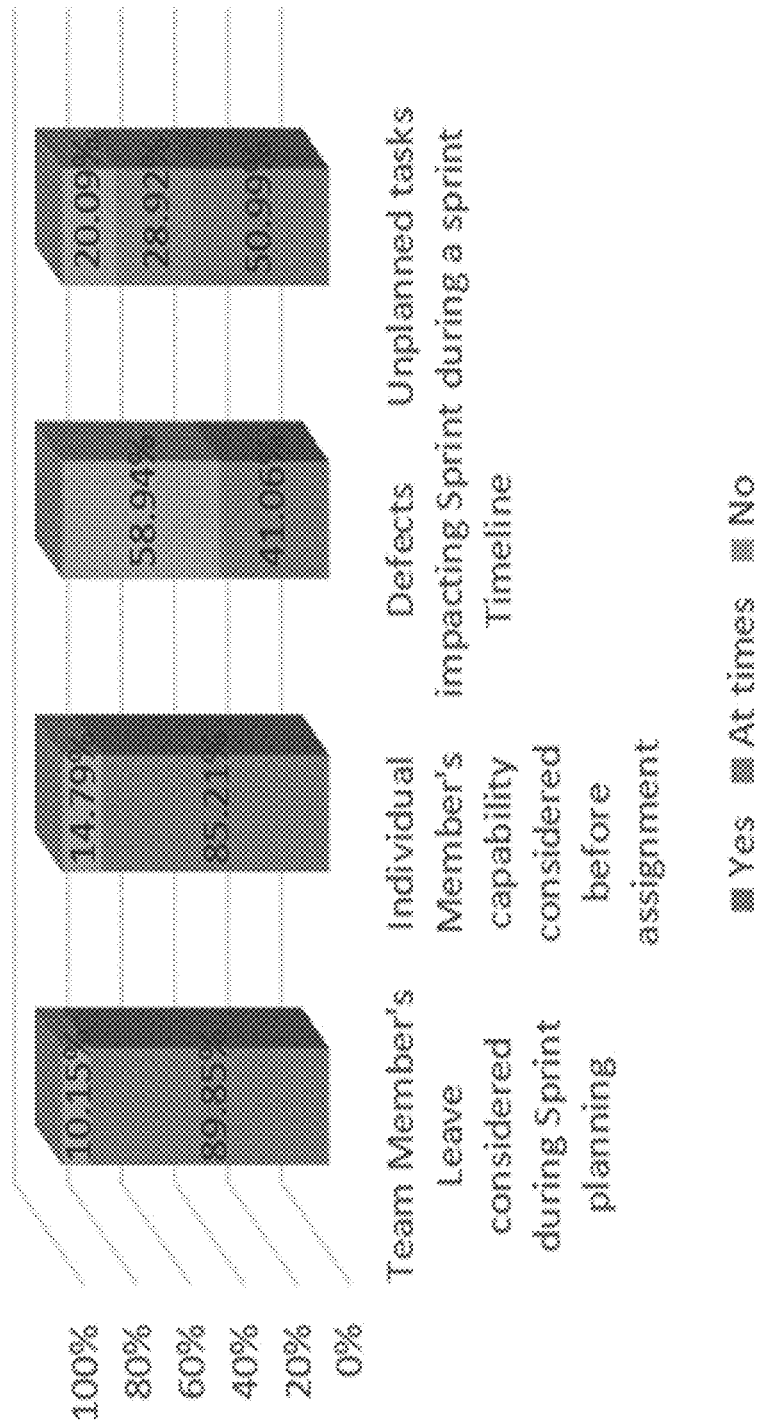
FIG. 2A illustrates a survey carried out across scrum masters in an organisation.
Figure 2B:
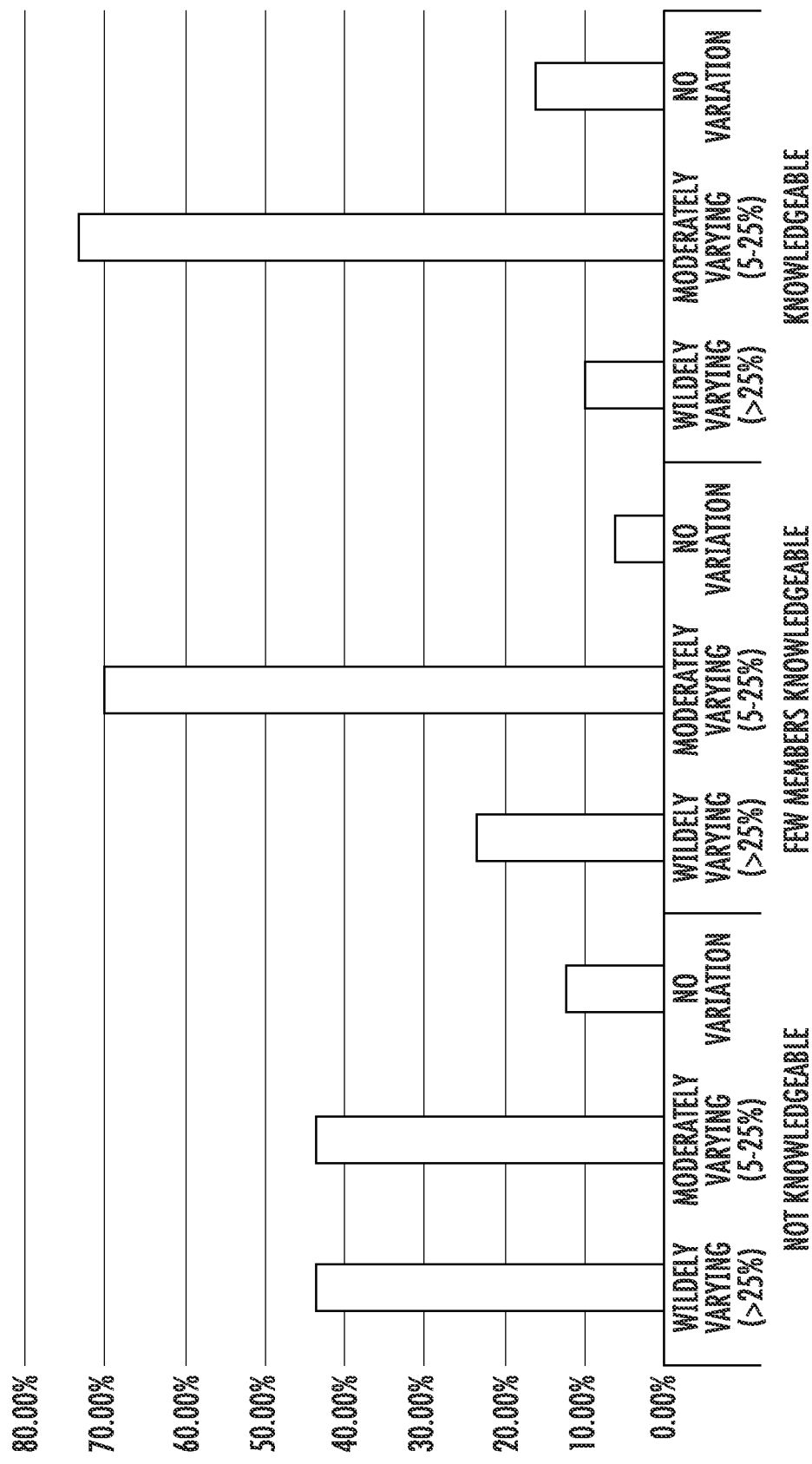
FIG. 2B illustrates variation of effort for a given story point based on team's estimation knowledge.
Figure 2C:
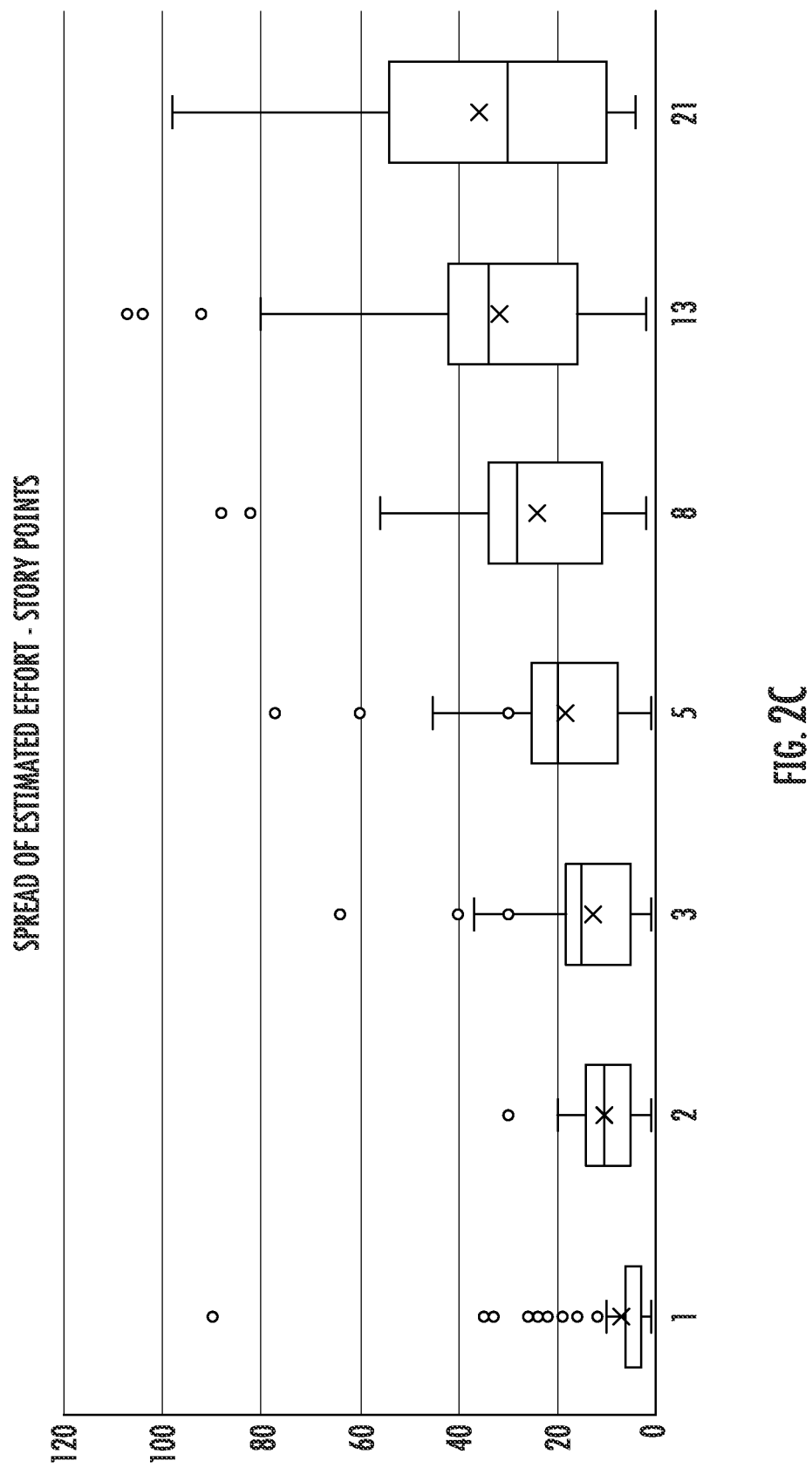
FIG. 2C illustrates a graph illustrating spread of estimated effort versus story points, in accordance with an embodiment of the present invention.
Figure 3:
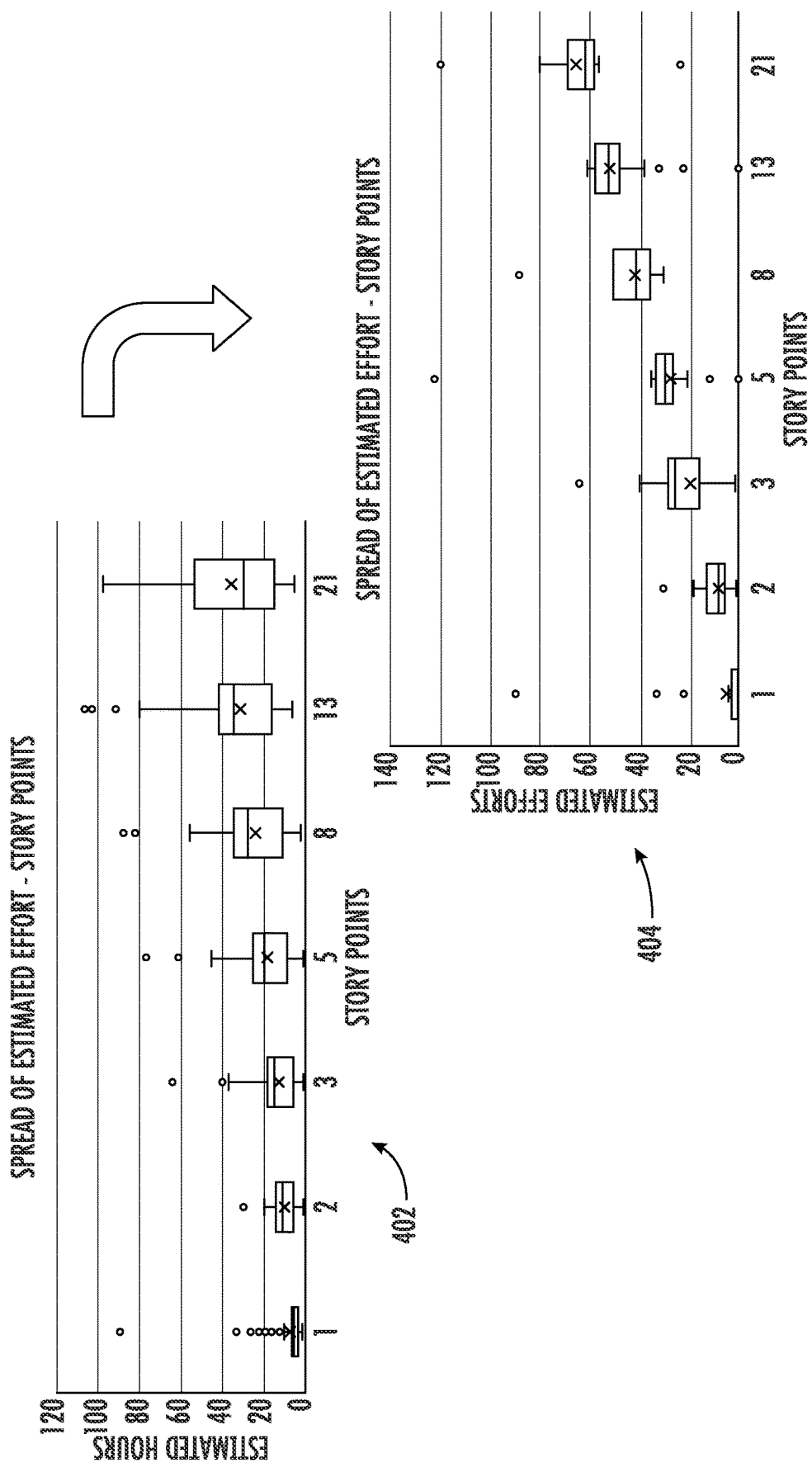
FIG. 3 illustrates a conversion of a first spread of estimated effort to a second spread of estimated effort, in accordance with an embodiment of the present invention.

In an example, as illustrated in FIG. 2C, the graph of spread of effort estimate values vs story points depicts a first spread of estimated effort. The graph depicts an overlap between story points with values 13 and 21 in terms of efforts and as such they are not mutually exclusive. As illustrated in FIG. 3, the estimation effort analysis unit 104 is configured to convert the first spread of estimated effort in terms of story points 402 to a second spread of estimated efforts in terms of story points 404 using a reference threshold value. The reference threshold value indicates a range that is determined using a specific story point that is distinct from a range of rest of the story points. The reference threshold value is determined by the estimation effort analysis unit 104 through continuous analysis to narrow down the range for a specific story point that is distinct from the range of rest of the story points. In an embodiment of the present invention, the estimation effort analysis unit 104 is configured to determine the reference threshold value by using "reference story board" where a set of representative cards are used to estimate story points for a specific user story. By converting from 402 to 404, mutually exclusive bands are derived, and predictability is high in 404 and in 402 predictability is low. In an exemplary embodiment of the present invention, the reference threshold values relate to completed user stories with story points and the sprint is delivered in a defined band of effort, where for each story point effort estimate values are in a predetermined range of a standard deviation.

In an embodiment of the present invention, the estimation effort analysis unit 104 is configured to fetch the input data from the input data unit 102 and determine a reference threshold value using a statistical model. The estimation effort analysis unit 104 is configured to determine the reference threshold value in a pre-defined range. In an embodiment of the present invention, the estimation effort analysis unit 104 is configured to analyse user story points for determining effort spent in executing corresponding tasks. In an embodiment of the present invention, the story points that lie in a range of one standard deviation of the effort is marked as reference threshold value. A set of one or more for each type of story point becomes reference story point to refer during future effort estimation. Standard deviation technique is used for measuring of reference threshold value since the technique is sensitive to outliers and provides a chance for picking up of appropriate reference stories.

In an exemplary embodiment of the present invention, the estimation effort analysis unit 104 determines an overshoot value based on the reference threshold value. The estimation effort analysis unit 104 is configured to determine the overshoot value by ascertaining user story with the effort value that lies outside a single standard deviation. The overshoot value is not considered while determining reference threshold value. In another exemplary embodiment of the present invention, the estimation effort analysis unit 104 is configured to avoid a story point drift. The story point drift occurs when a similar story point is provided either as a higher story point value or a lower story point value determined over a period of time. While the story point drift towards lower story point is indicative of higher productivity, the story point drift towards higher story point indicates less productivity although velocity value remains same. In case of the drift, suggestions are provided as reference threshold values by estimation effort analysis unit 104 via a User Interface (UI) on how drifting may be prevented. In an embodiment of the present invention, the estimation effort analysis unit 104 is configured to update the reference threshold values in real-time based on the input data fetched from the input data unit 102. The user stories that have very low or very high effort estimate values are not used for deriving reference threshold values. Also, the estimation effort analysis unit 104 is configured to ensure that reference threshold value relate to a user story that has effort estimate values in a pre-determined range for that story point.

In an embodiment of the present invention, the pre-processing unit 106 is configured to fetch input data from the input data unit 102 and determine a second feature dataset. The second feature dataset includes data values obtained based on the previous sprints. In an exemplary embodiment of the present invention, the second feature dataset comprises one or more first data values that relate to new terms identified in the user stories in an upcoming sprint that are not present in the previous sprint. Further, the second feature dataset comprises one or more second data values that relate to number of user stories. The second feature dataset comprises one or more third data values that relate to number of developers. The second feature dataset further comprises one or more fourth data values that relate to a number of Quality Assurance (QA) personnel. The second feature dataset also comprises one or more fifth data values that relate to complexity indicated by distribution of user stories across story points. Further, the second feature dataset comprises one or more sixth data values that relate to module wise count of user stories. The second feature dataset also comprises one or more seventh data values that relate to changes in composition of team members that is captured in terms of incremental change compared to previous sprint.

In an embodiment of the present invention, the second feature dataset is configurable via the UI depending on data availability. The defect prediction unit 108 is configured to fetch the second feature dataset from the pre-processing unit 106 and analyze the second feature dataset to identify correlated axis values. In an exemplary embodiment of the present invention, the analysis is performed employing Principal Component Analysis (PCA) on the second feature dataset to identify the correlated axis values associated with the data values of the previous sprints. The defect prediction unit 108 is configured to identify one or more attributes in the second feature dataset that may or may not contribute to defects. The one or more attributes are identified via a correlation operation executed by the defect prediction unit 108. The defect prediction unit 108 is configured to compress the second feature dataset into a correlated feature dataset that is achieved via PCA analysis to enable deriving a new set of feature values that represents values from underlying features through use of eigen values and eigen vectors. In the embodiment of the present invention, the defect prediction unit 108 is configured to predict number of defects in the sprint based on the determined correlated axis values. The predicted number of defects are stored as a third feature dataset in the defect prediction unit 108.

Figure 4:
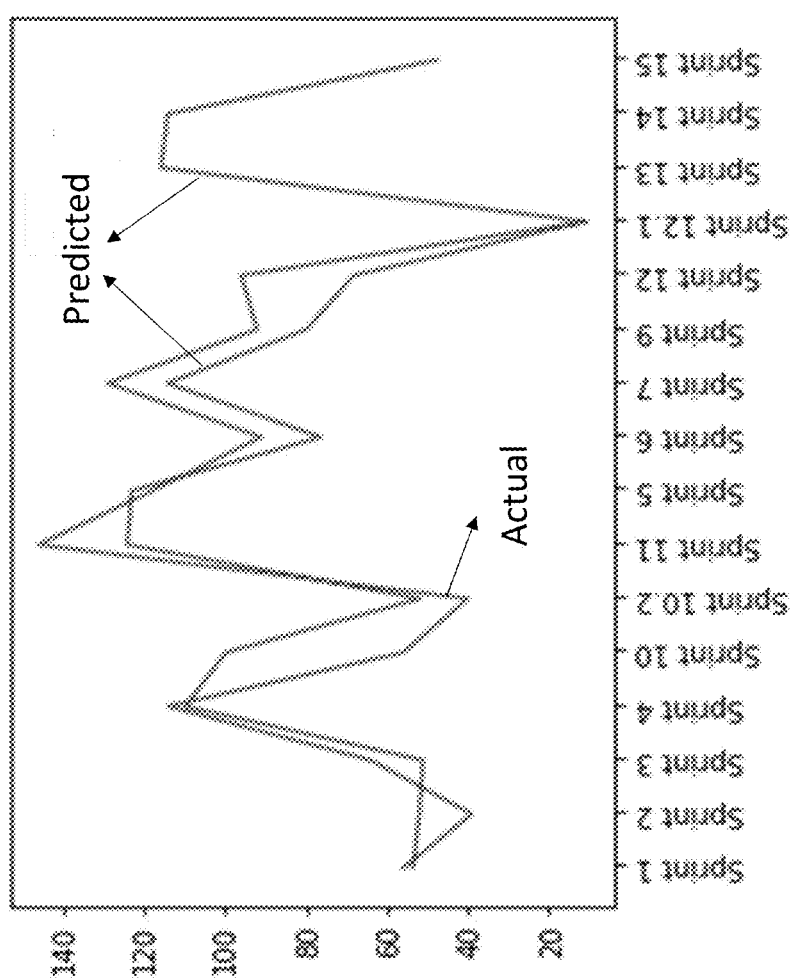
FIG. 4 illustrates accuracy of prediction of the defects, in accordance with an embodiment of the present invention.

In an embodiment of the present invention, the defect prediction unit 108 is configured to execute a regression model that uses XGBoost regressor based technique where the second feature dataset computed from all previous sprints along with the previous defect count is fed for training the regression model. In accordance with an exemplary embodiment of the present invention, accuracy of prediction of the defects by the defect prediction unit 108 with data of ~2000 user stories of the project is high as demonstrated in FIG. 4. In this exemplary embodiment, $r^2$ scores ranges from 0.7 to 0.9 for various feature datasets that are executed on the regression model which indicates higher accuracy. Advantageously, no user input is required, and historical user stories are utilised to predict the defects. The defect variance (predicted-actual) is calculated in the graph as illustrated in FIG. 4.

In another embodiment of the present invention, the defect prediction unit 108 is configured to determine set of historical defects from a defect backlog based on the defect count that may be fixed in the upcoming sprint with optimal effort. The defect prediction unit 108 is configured to compare the user stories of upcoming sprint with defects and compare sprint's user story descriptions with defects in the backlog using cosine similarity. The defect prediction unit 108 then stores the comparison data as a fourth feature dataset. Also, upcoming sprint's user story descriptions are compared with defects in the backlog. In an embodiment of the present invention, upcoming sprint's user story descriptions are compared with user stories associated with the defects in the defect backlog using cosine similarity. The defect prediction unit 108 is configured to identify defects that are raised in the past releases and suggests removing the defects from the backlog since that defect may no longer be relevant.

In an embodiment of the present invention, the forecasting unit 110 is configured to fetch the input data from the input data unit 102 and forecasts unplanned work data as a fifth feature dataset. Unplanned work is defined as tasks that are added during course of the sprint after the sprint has started. The forecasting unit 110 is configured to assess the historical input data fetched from the input data unit 102 and based on the history of user story assigned to a particular sprint in the input data, the forecasting unit 110 determines sprint field that changes during course of sprint and the user story is labelled as unplanned work. Also, the tasks in the input data without any proper user story are also categorised as unplanned work. Typically, initial 2-3 days of a sprint may still see some changes in the sprint and hence the forecasting unit 110 does not take 2-3 days into consideration for calculating unplanned work.

In an embodiment of the present invention, the forecasting unit 110 is configured to compute historical data of unplanned task for every sprint and forecasts a timeseries data forecasting unplanned task for upcoming sprint. The forecasting unit 110 is configured to identify unplanned work by analysing history of modifications carried out for the user story in the input data. Typically, if there are assigned adhoc, a task is created to account for the effort, but the tasks are not tied to a user story and, as such, the tasks are also considered as unplanned work. Further, unplanned tasks may be seasonal or not seasonal. The forecasting unit 110 determines if the historical data is seasonal or not for forecasting unplanned task.

Figure 5:
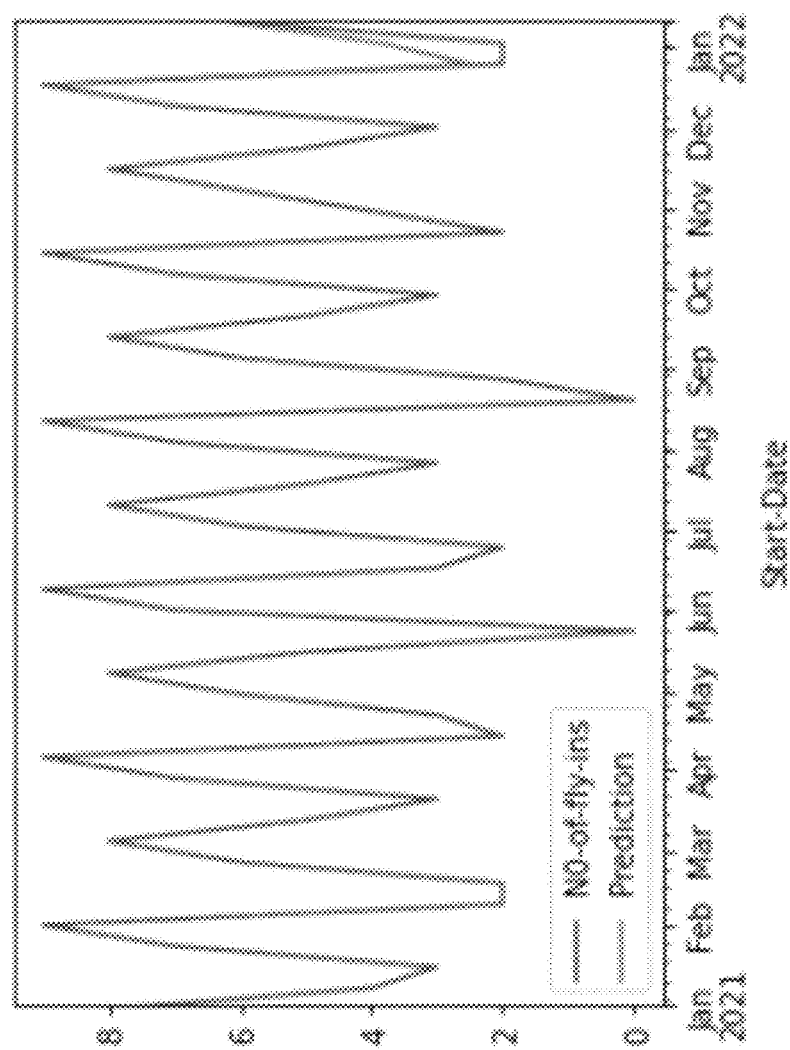
FIG. 5 illustrates a time series graph that forecasts unplanned tasks, in accordance with an embodiment of the present invention.

In an embodiment of the present invention, the forecasting unit 110 determine a timeseries data for forecasting unplanned task for upcoming sprint based on analysis of the input data associated with unplanned task of the previous sprints. In an exemplary embodiment of the present invention, unit the forecasting 110 employs Facebook's Prophet® algorithm, which is a time series algorithm, to forecast unplanned task where the algorithm provides good accuracy with the input data that may have multiple seasonality, outliers and change points. In an embodiment of the present invention, the forecasting unit 110 is configured to execute Generative Adaptive Model (GAM) on the input data for forecasting unplanned task. In an embodiment of the present invention, the forecasting unit 110 is configured to identify seasonality using SARIMAX (Seasonal Auto-Regressive Integrated Moving Average with exogenous factors). Depending on output from SARIMAX, Prophet® is optimised for seasonal timeseries or non-seasonal timeseries. FIG. 5 illustrates a time series graph that t forecasts unplanned tasks, in accordance with an embodiment of the present invention.

In an embodiment of the present invention, the risk estimation unit 112 is configured to fetch the input data from the input data unit 102 and determine dataset associated with attributes associated with story point data of an upcoming sprint based on the input data associated with the previous sprints. In an exemplary embodiment of the present invention, the attributes include velocity data, anomalies, repeatable tasks associated with story point data of an upcoming sprint. In an embodiment of the present invention, the risk estimation unit 112 fetches the input data from the input data unit 102 and determines if a team member is over allocated or under allocated by determining velocity data at a team member level. In an exemplary embodiment of the present invention, the risk estimation unit 112 is configured to consider each member's delivered story points in last three sprints from the input data and calculate average data for the story point data for determination of the velocity data. The risk estimation unit 112 is configured to compare velocity data with story point data assigned in the upcoming sprint and store the comparison as a sixth feature dataset. In an example, if the assigned story point data is greater than 1.1 times the members velocity data, then it is highlighted as over allocation. If the assigned story point data is lesser than 0.9 times the members velocity, then it is highlighted as under allocation data.

In an embodiment of the present invention, the risk estimation unit 112 is configured to fetch input data from the input data unit 102 and identify user stories that are completely new and store it as a seventh feature dataset. Also, the risk estimation unit 112 is configured to identify user stories that are created sometime in the past and assigned to upcoming sprint without any modifications. In an exemplary embodiment of the present invention, the risk estimation unit 112 is configured to identify new stories by using One-Class SVM model where the model is trained on the user stories from the historical input data and any anomalies found in the user stories in the upcoming sprint is identified and highlighted.

In another exemplary embodiment of the present invention, the risk estimation unit 112 is configured to execute named entity recognition on the input historical data to identify anomalies in user stories in upcoming sprint using Natural Language Processing (NLP) technique and store it as an eight feature dataset. In yet another embodiment of the present invention, a combination of One-Class SVM model and NLP technique is used by the risk estimation unit 112 to identify the user stories that are completely new for highlighting risk and stores the anomalies as an eighth feature dataset. The risk estimation unit 112 is configured to identify revision history of user stories received from the input data unit 102 to verify if the story description or title or acceptance criteria is updated between the time it was created and assigned to the upcoming sprint. The stories that do not have these updates are flagged by the risk estimation unit 112 as at risk of being ungroomed and hence having higher chances of being left incomplete.

In an embodiment of the present invention, the identification unit 114 is configured to fetch input data from the input data source 102 and identify repeatable tasks within repeatable stories. In an exemplary embodiment of the present invention, the identification unit 114 identifies repeatable tasks by using a nested algorithm-based model and stores data related to repeatable tasks as a ninth feature dataset. The identification unit 114 is configured to use similarity threshold as a parameter such that clusters are formed with the user stories and tasks that are above the similarity threshold are marked. Also, this helps to overcome issue of having to deal with bad clusters, clusters with very poor similarity, which from is typically obtained conventional clustering techniques such as KMeans. The nested model executed by the identification unit 114 is explained in the flow chart in FIG. 6, in accordance with an embodiment of the present invention.

Figure 6:
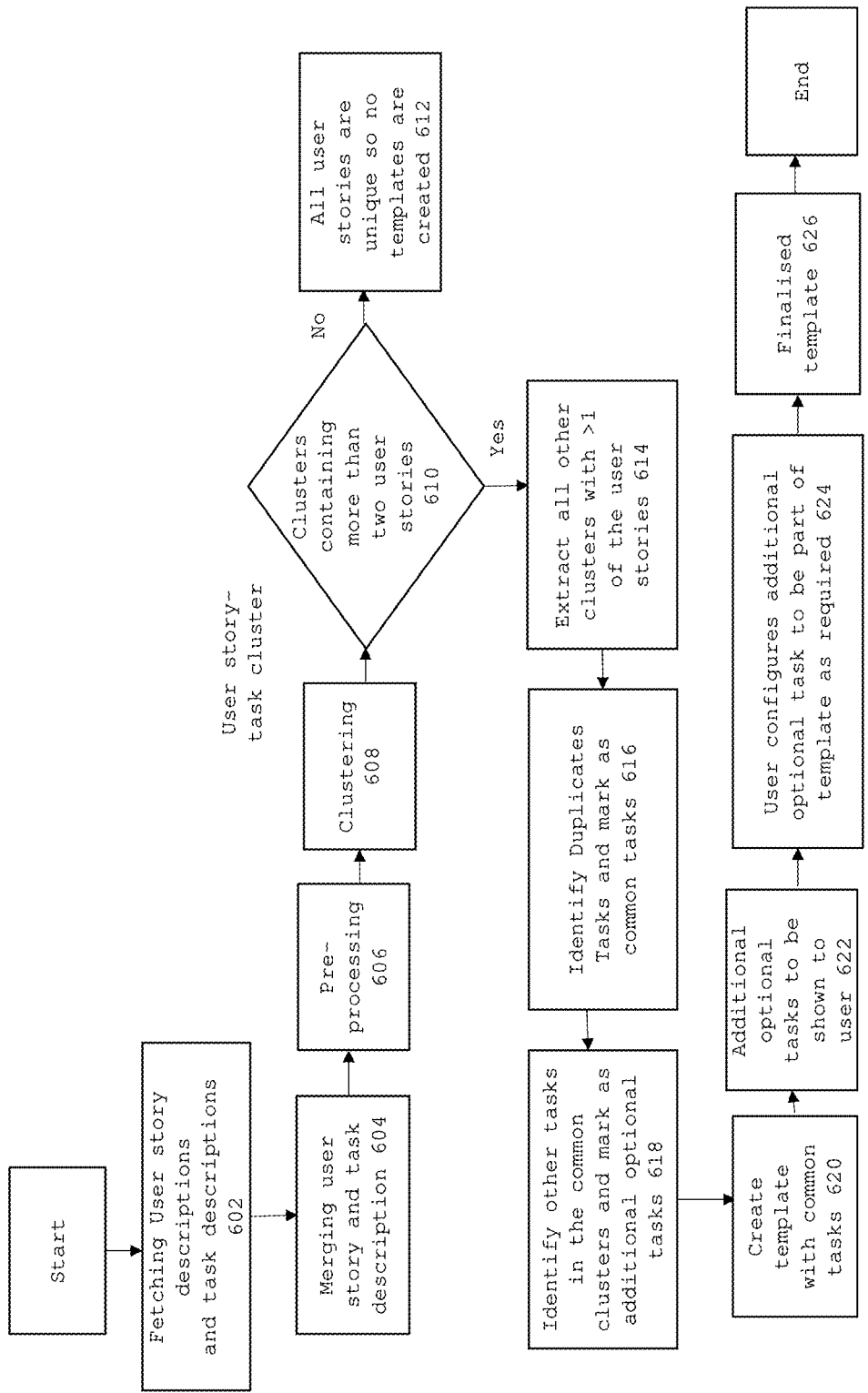
FIG. 6 illustrates a flow chart of a nested model, in accordance with an embodiment of the present invention.

As illustrated in FIG. 6, at step 602, user story descriptions and task descriptions are fetched from the input data. At step 604, the user stories and task descriptions are merged to form a merged story and at step 606 pre-processing is performed on the merged story. At step 608, clustering is performed on the merged story and at step 610, it is checked whether the clusters contain more than two user stories. In the event, it is identified at step 610 that the clusters do not contain more than two user stories, then it is determined that all user stories are unique and no templates are created at step 612. In the event it is determined that the clusters have more than two user stories at 610, then at step 614, all other clusters that are greater than 1 of the user stories are extracted. At step 616, duplicate tasks are identified in the clusters and marked as common tasks. At step 618, other tasks in the common clusters are identified and marked as additional optional tasks. At step 620, template with common tasks is created and at step 622, additional optional tasks are shown to the users. At step 624, users configure additional optional tasks to be part of template as required and at step 626, the template is finalised.

Figure 7:
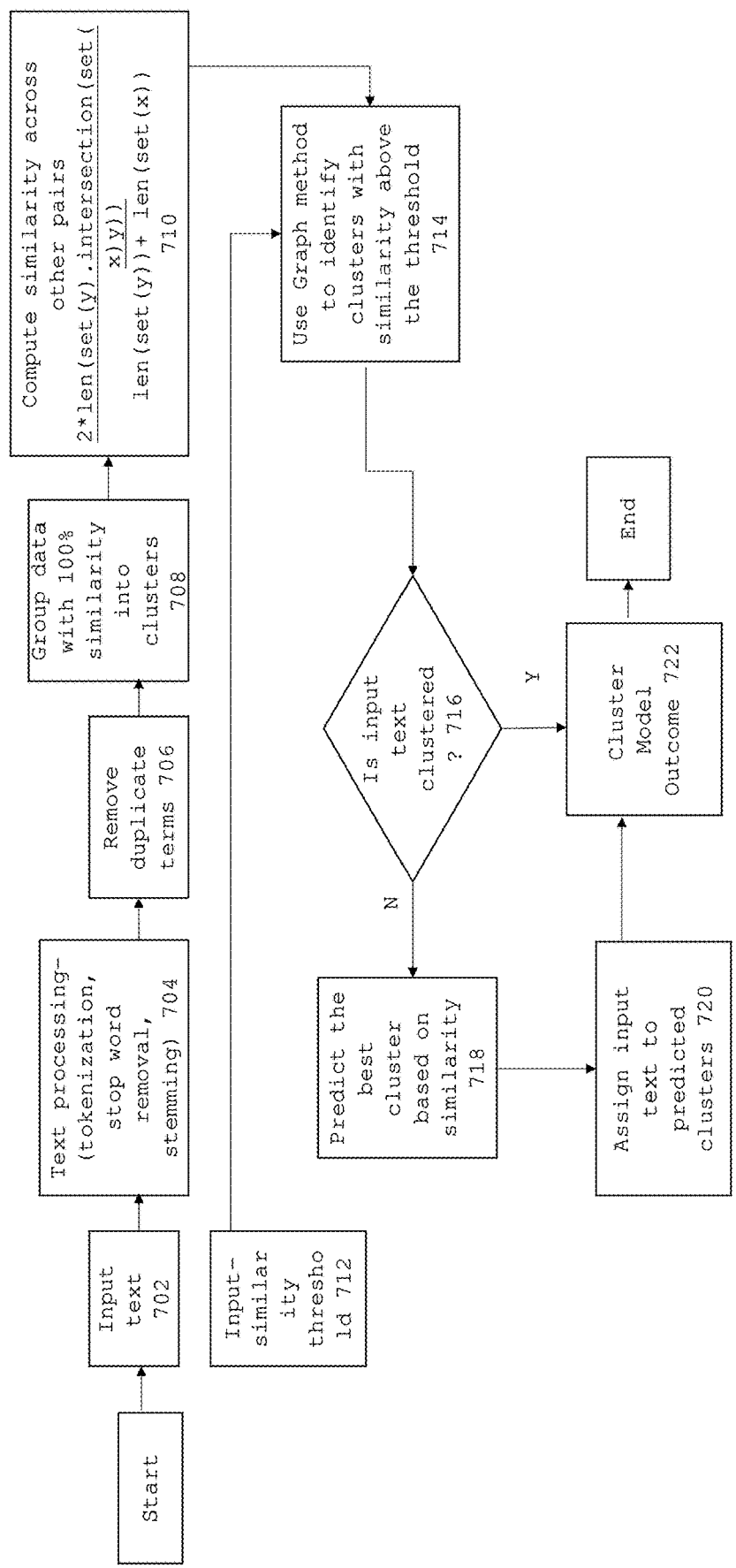
FIG. 7 illustrates a process flow of a clustering technique, in accordance with an embodiment of the present invention.

In an embodiment of the present invention, the identification unit 116 is configured to identify back clusters and repeatable tasks, thereby overcoming issues of having to deal with bad clusters which is typically present in KMeans and hierarchical clustering. The identification unit 116 is configured to provide flexibility to developers to select a required similarity. In an exemplary embodiment of the present invention, the clustering technique is explained in the process flow depicted in FIG. 7. As shown in FIG. 7, at step 702, text data is taken as input and text processing such as tokenization, stop word removal, stemming is carried out on the text at step 704. At step 706, duplicate terms are removed and at step 708, data is grouped with 100 percent similarity into clusters. At step 710, similarity is computed across other pairs and at step 714a graph method is used to identify clusters with similarity above threshold and with similarity threshold provided as input at step 712. At step 716, it is analysed whether input text is clustered and in case input text is not clustered, step 718 is implemented that predicts base cluster based on similarity. Subsequently, at step 720 input text is assigned to predicted clusters. In the event it is determined that input text is clustered, cluster outcome is obtained at step 722.

In an embodiment of the present invention, the capacity optimization unit 122 is configured to fetch and combine the first feature dataset, second feature dataset, third feature dataset, fourth feature dataset, fifth feature dataset, sixth feature dataset, seventh feature dataset, eight feature dataset and ninth feature dataset into a tenth feature dataset, which provides insights required for optimizing sprint-based tasks. The tenth feature dataset is employed as a persistent identifier for sprint capacity buffer data values for optimizing sprint based-tasks in agile methodology. In an exemplary embodiment of the present invention, the optimization of sprint-based tasks includes, but are not limited to, optimised allocation of time and resources for the sprint-based tasks, thereby improving agile methodology.

Figure 8:
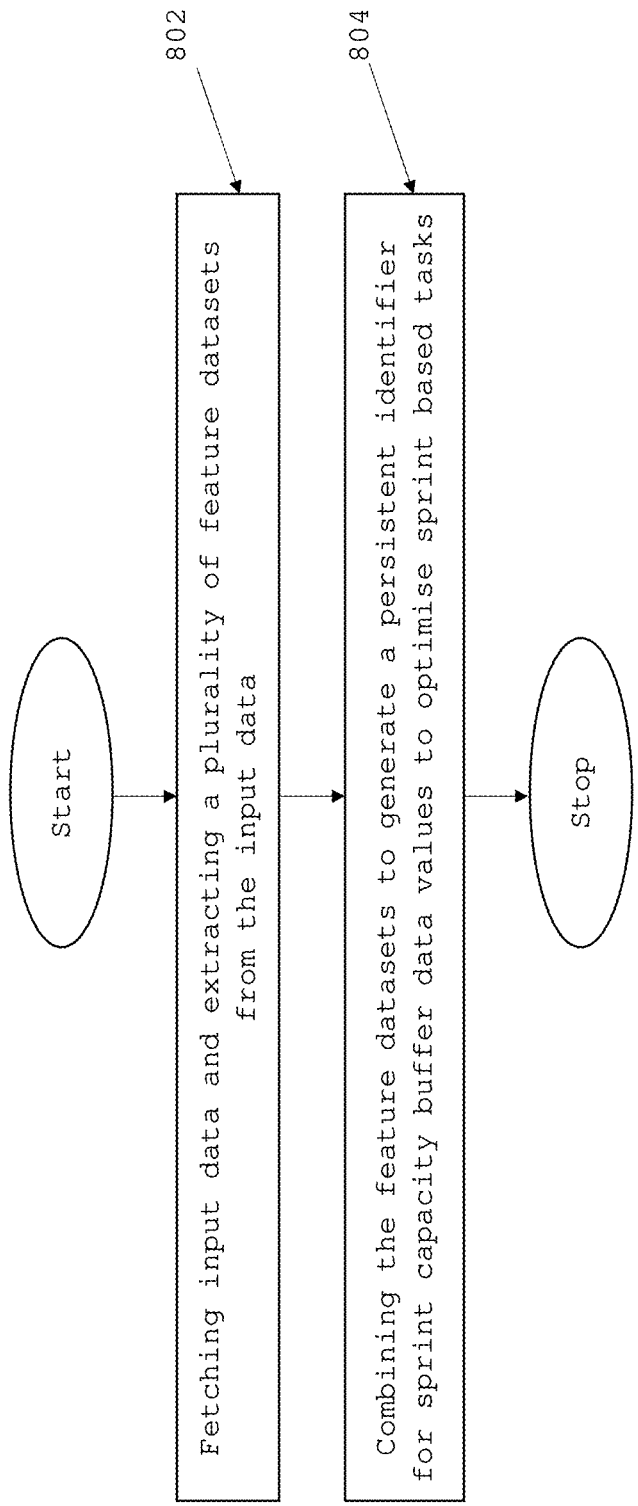
FIG. 8 illustrates a flow chart of a method for optimising sprint planning in agile methodology, in accordance with an embodiment of the present invention.

FIG. 8 illustrates a flow chart of a method for optimising sprint planning in agile methodology, in accordance with an embodiment of the present invention.

At step 802, input data is fetched and a plurality of feature datasets are extracted from the input data. In an embodiment of the present invention, the input data is fetched from ALM tools and story point data is analysed in the input data to determine a first feature dataset. The first feature dataset includes effort estimate values which are related to effort involved by teams in the stories being implemented as part of agile tasks. The input data comprises of data related to historical user stories captured during previous sprints implemented in the agile methodology by the ALM tools.

In an embodiment of the present invention, the effort estimate values are stored as a first feature data in a database (not shown). The story point data in the input data provides insights of tasks that were executed in the past stories. The input data relating to tasks implemented in the user stories is analysed that represent effort involved in executing the story points and determine inter quartile range (IQR) value, lower/upper boundaries and outliers using the task data. Outliers in the story points are highlighted in terms of effort spent on the story points. In an exemplary embodiment of the present invention, any overlap in IQR value of effort across story points indicates poor story point estimation that is visualised using box plots via a User Interface (UI).

In an example, as illustrated in FIG. 2C, the graph of spread of effort estimate values vs story points depicts a first spread of estimated effort. The graph depicts an overlap between story points with values 13 and 21 in terms of efforts and as such they are not mutually exclusive. The first spread of estimated effort in terms of story points (402) is converted to a second spread of estimated efforts in terms of story points (404) using a reference threshold value. The reference threshold values indicate a range that is determined using a specific story point that is distinct from a range of rest of the story points. In an embodiment of the present invention, a reference threshold value is determined using a statistical model and the reference threshold value is determined in a pre-defined range. The reference threshold is determined through continuous analysis to narrow down range for a specific story point that is also distinct from range of other story points.

In an embodiment of the present invention, the reference threshold value is determined by using "reference story board" where a set of representative cards are used to estimate story points for a specific user story. By converting 402 to 404, mutually exclusive bands are derived, where predictability is high in 404 and in 402 predictability is low. In an exemplary embodiment of the present invention, the reference threshold values relate to completed user stories with story points and the sprint is delivered in a defined band of effort, where for each story point effort estimate values are in a pre-determined range of a standard deviation.

In an embodiment of the present invention, user story points are analysed for determining effort spent in executing corresponding tasks. In an embodiment of the present invention, the story points that lie in a range of one standard deviation of the effort are marked as reference threshold value. A set of one or more for each type of story point becomes reference story point for reference during future effort estimation. Further, standard deviation technique is used for measuring of reference threshold value since the technique is sensitive to outliers and provides a chance for picking up of appropriate reference stories.

In an exemplary embodiment of the present invention, an overshoot value is determined based on the reference threshold value. The user story with the effort value that lies outside single standard deviation is marked as the overshoot value. The overshoot value is not considered while determining reference threshold value. A story point drift is avoided in story points where the story point drift occurs when a similar story point is provided either as a higher story point value or a lower story point value determined over a period of time. While the story point drift towards lower story point is indicative of higher productivity, the story point drift towards higher story point indicates less productivity to customers although velocity value remains same.

In case of drifts, suggestions are provided as reference threshold values via a User Interface (UI) on how drifting may be prevented. The reference threshold values are updated in real-time based on the input data. The user stories that have very low or very high effort estimate values are not used for deriving reference threshold values. Also, reference threshold value relates to a user story that has effort estimate values in a pre-determined range for that story point.

In an embodiment of the present invention, a second feature dataset is determined from the input data. The second feature dataset includes data values obtained based on the previous sprints. In an exemplary embodiment of the present invention, the second feature dataset comprises one or more first data values that relate to new terms identified in the user stories in an upcoming sprint that are not present in the previous sprint. Further, the second feature dataset comprises one or more second data values that relate to number of user stories. The second feature dataset comprises one or more third data values that relate to number of developers. The second feature dataset further comprises one or more fourth data values that relate to a number of Quality Assurance (QA) personnel. The second feature dataset also comprises one or more fifth data values that relate to complexity indicated by distribution of user stories across story points. Further, the second feature dataset comprises one or more sixth data values that relate to module wise count of user stories. The second feature dataset also comprises one or more seventh data values that relate to changes in composition of team members that is captured in terms of incremental change compared to previous sprint.

In an embodiment of the present invention, the second feature dataset is configurable via the UI depending on data availability. The second feature dataset is fetched and analysed to identify correlated axis values. In an exemplary embodiment of the present invention, the analysis is performed employing Principal Component Analysis (PCA) on the second feature dataset to identify the correlated axis values associated with the data values of the previous sprints. One or more attributes are identified in the second feature dataset that may or may not contribute to defects. The one or more attributes are identified via a correlation operation. The second feature dataset is compressed into a correlated feature dataset that is achieved via PCA analysis which enables deriving a new set of feature values that represents values from underlying features through use of eigen values and eigen vectors.

In the embodiment of the present invention, number of defects are predicted in the sprint based on the determined correlated axis values. The predicted number of defects are stored as a third feature dataset. In an embodiment of the present invention, a regression model is executed that uses XGBoost regressor based technique where the second feature dataset computed from all previous sprints along with the previous defect count are fed for training the regression model. In accordance with an exemplary embodiment of the present invention, accuracy of prediction of the defects with data of ~2000 user stories of the project is high as demonstrated in FIG. 4. In this exemplary embodiment, $r^2$ scores ranges from 0.7 to 0.9 for various feature datasets that are executed on the regression model which indicates higher accuracy. Advantageously, no user input is required, and historical user stories are utilised to predict the defects. The defect variance (predicted-actual) is calculated in the graph as illustrated in FIG. 4, in accordance with an embodiment of the present invention.

In another embodiment of the present invention, a set of historical defects are determined from a defect backlog based on the defect count that may be fixed in the upcoming sprint with optimal effort. The user stories of upcoming sprint are compared with defects and sprint's user story descriptions are compared with defects in the backlog using cosine similarity. The comparison data is stored as a fourth feature dataset. Also, upcoming sprint's user story descriptions are compared with defects in the backlog. In an embodiment of the present invention, upcoming sprint's user story descriptions are compared with user stories associated with the defects in the defect backlog using cosine similarity. The defects are identified that are raised in the past releases and suggestions are provided for removing the defects from the backlog since that defect may no longer be relevant.

In an embodiment of the present invention, unplanned work from the input data is forecast as a fifth feature dataset. Unplanned work is defined as tasks that are added during course of the sprint after the sprint has started. The historical input data is fetched and based on the history of user story assigned to a particular sprint in the input data, sprint field is determined that changes during course of sprint and the user story is labelled as unplanned work. Also, the tasks in the input data without any proper user story are also categorised as unplanned work. Typically, initial 2-3 days of a sprint may still see some changes in the sprint and hence 2-3 days is not taken into consideration for calculating unplanned work.

In an embodiment of the present invention, historical data of unplanned task is computed for every sprint and a timeseries data is forecasted for forecasting unplanned task for upcoming sprint. Unplanned work is identified by analysing history of modifications carried out for the user story in the input data. Typically, if work is determined to be adhoc, a task is created to account for the effort, but the tasks are not tied to a user story and, as such, the tasks are also considered as unplanned work. Further, unplanned tasks may be seasonal or not seasonal. It is determined if the historical data is seasonal or not for forecasting unplanned task.

In an embodiment of the present invention, a timeseries data is determined for forecasting unplanned task for upcoming sprint based on analysis of the input data associated with unplanned task of the previous sprints. In an exemplary embodiment of the present invention, Facebook's Prophet® algorithm is employed which is a timeseries algorithm, to forecast unplanned task where the algorithm provides good accuracy with the input data that may have multiple seasonality, outliers and change points. In an exemplary embodiment of the present invention, A Generative Adaptive Model (GAM) is executed on the input data for forecasting unplanned task. In an exemplary embodiment of the present invention, seasonality is identified using SARIMAX (Seasonal Auto-Regressive Integrated Moving Average with exogenous factors). Depending on output from SARIMAX, Prophet® is optimised for seasonal timeseries or non-seasonal timeseries. FIG. 5 illustrates a timeseries graph that forecasts unplanned tasks, in accordance with an embodiment of the present invention.

In an embodiment of the present invention, a dataset is determined associated with attributes corresponding to story point data of an upcoming sprint based on the input data associated with the previous sprints. In an exemplary embodiment of the present invention, the attributes include velocity data, anomalies, repeatable tasks associated with story point data of an upcoming sprint. In an embodiment of the present invention, the input data is fetched and it is determined if a team member is over allocated or under allocated by determining velocity data at a team member level. In an exemplary embodiment of the present invention, each member's delivered story points are considered in last three sprints from the input data and average data is calculated for the story point data for determination of the velocity data. Velocity data is compared with story point data assigned in the upcoming sprint and the comparison is stored as a sixth feature dataset. In an example, if the assigned story point data is greater than 1.1 times the members velocity data, then it is highlighted as over allocation. If the assigned story point data is lesser than 0.9 times the members velocity, then it is highlighted as under allocation data.

In an embodiment of the present invention, the input data is fetched and user stories are identified that are completely new and stored as a seventh feature dataset. Also user stories are identified that are created sometime in the past and assigned sprint to upcoming without any modifications. In an exemplary embodiment of the present invention, new stories are identified by using One-Class SVM model where the model is trained on the user stories from the historical input data and any anomalies found in the user stories in the upcoming sprint is identified and highlighted.

In another embodiment of the present invention, named entity recognition is executed on the input historical data to identify anomalies in user stories in upcoming sprint using Natural Language Processing (NLP) technique and stored as an eight feature dataset. In yet another embodiment of the present invention, a combination of One-Class SVM model and NLP technique is used to identify the user stories that are completely new for highlighting risk and stores the anomalies as an eighth feature dataset. Revision history of user stories is identified to verify if the story description or title or acceptance criteria is updated between the time it was created and assigned to the upcoming sprint. The stories that do not have these updates are flagged as at risk of being ungroomed and hence having higher chances of being left incomplete.

In an embodiment of the present invention, input data is fetched, and repeatable tasks are identified within repeatable stories. In an exemplary embodiment of the present invention, repeatable tasks are identified by using a nested algorithm-based model and data related to repeatable tasks is stored as a ninth feature dataset. Similarity threshold is used as a parameter such that clusters are formed with the user stories and tasks that are above the similarity threshold are marked. Also, this helps to overcome issue of having to deal with bad clusters, clusters with very poor similarity, which is typically obtained from conventional clustering techniques such as KMeans. The nested model is explained in the flow chart in FIG. 6, in accordance with an embodiment of the present invention, as described above.

In an embodiment of the present invention, back clusters and repeatable tasks are identified, thereby overcoming issues of having to deal with bad clusters which is typically present in KMeans and hierarchical clustering. Flexibility is provided to developers to select a required similarity. In an exemplary embodiment of the present invention, the clustering technique is explained in the process flow depicted in FIG. 7, as described above.

At step 804, a plurality of feature datasets are combined to generate a persistent identifier for sprint capacity buffer data values to optimise sprint-based tasks in agile methodology. In an embodiment of the present invention, the first feature dataset, second feature dataset, third feature dataset, fourth feature dataset, fifth feature dataset, sixth feature dataset, seventh feature dataset, eight feature dataset and ninth feature dataset is fetched and combined into a tenth feature dataset which provides insights required for optimizing sprint-based tasks. The tenth feature dataset is employed as the persistent identifier for sprint capacity buffer data values for optimizing sprint based tasks in agile methodology. The optimization of sprint-based tasks includes, but are not limited to, optimised allocation of time and resources for the sprint-based tasks, thereby improving agile methodology.

Advantageously, in an embodiment of the present invention, uncertainties provided during the time of planning in the agile methodology are reduced and hence, there is a high probability of delivering all committed work items on time. Also, the task optimisation engine 116 avoids estimation drifts thereby increasing value of the deliverables that in turn leads to productivity improvement. The system 100 provides clear functional debt with minimal effort overhead and avoids manual effort in creating repeated set of tasks or user stories by creating templates.

Figure 9:
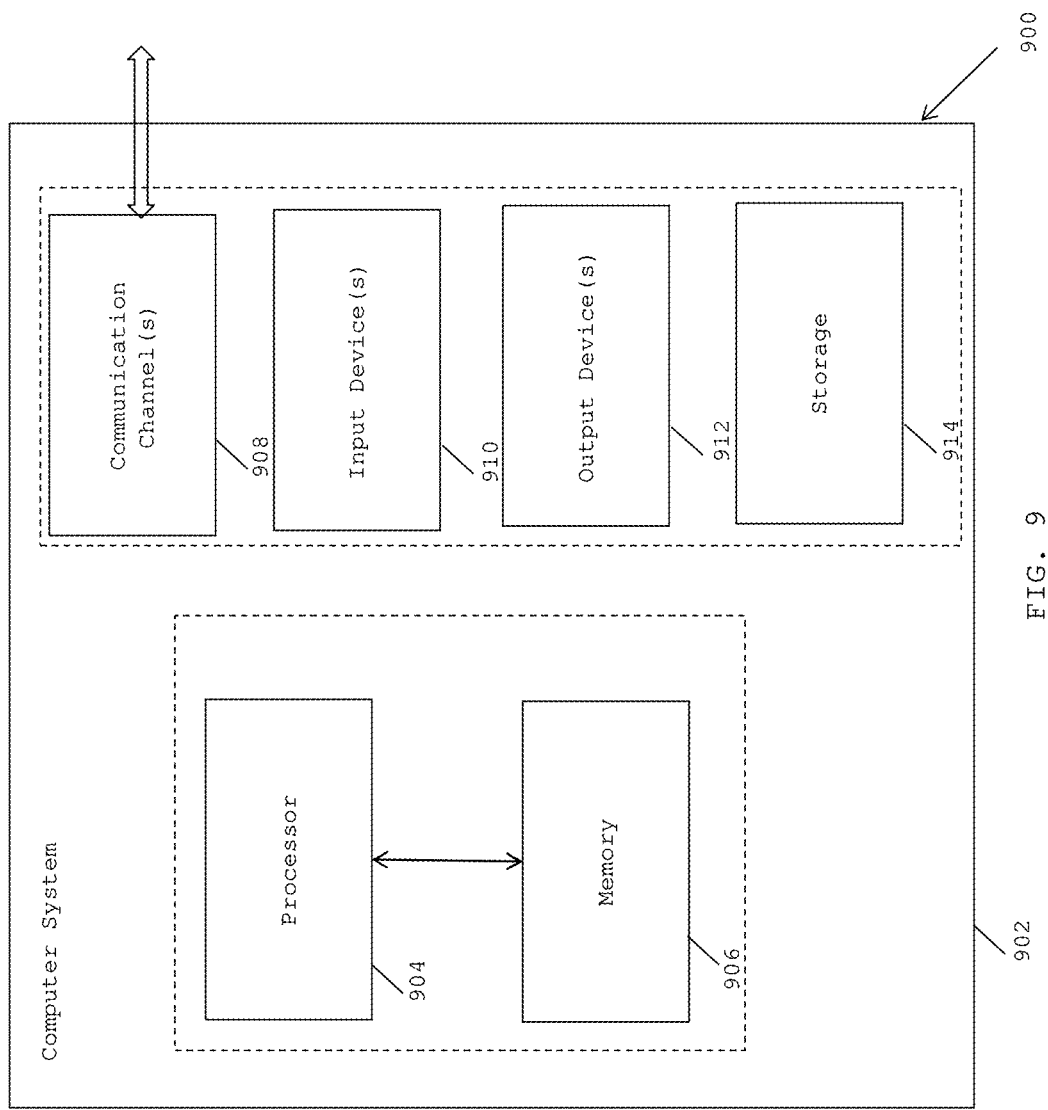
FIG. 9 illustrates an exemplary computer system in which various embodiments of the present invention may be implemented.

FIG. 9 illustrates an exemplary computer system in which various embodiments of the present invention may be implemented. The computer system 902 comprises a processor 904 and a memory 906. The processor 904 executes program instructions and is a real processor. The computer system 902 is not intended to suggest any limitation as to scope of use or functionality of described embodiments. For example, the computer system 902 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 906 may store software for implementing an embodiment of the present invention. The computer system 902 may have additional components. For example, the computer system 902 includes one or more communication channels 908, one or more input devices 910, one or more output devices 912, and storage 914. An interconnection mechanism (not shown) such as a bus, controller, or network, interconnects the components of the computer system 902. In an embodiment of the present invention, operating system software (not shown) provides an operating environment for various software executing in the computer system 902, and manages different functionalities of the components of the computer system 902.

The communication channel(s) 908 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 910 may include, but not limited to, a keyboard, mouse, pen, joystick, trackball, a voice device, a scanning device, touch screen or any another device that is capable of providing input to the computer system 902. In an embodiment of the present invention, the input device(s) 910 may be a sound card or similar device that accepts audio input in analog or digital form. The output device(s) 912 may include, but not limited to, a user interface on CRT or LCD, printer, speaker, CD/DVD writer, or any other device that provides output from the computer system 902.

The storage 914 may include, but not limited to, magnetic disks, magnetic tapes, CD-ROMs, CD-RWs, DVDs, flash drives or any other medium which can be used to store information and can be accessed by the computer system 902. In an embodiment of the present invention, the storage 914 contains program instructions for implementing the described embodiments.

The present invention may suitably be embodied as a computer program product for use with the computer system 902. The method described herein is typically implemented as a computer program product, comprising a set of program instructions which is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s)

908. The implementation of the invention as a computer program product may be in an intangible form using wireless techniques, including but not limited to infrared, microwave, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for optimizing sprint-based tasks implemented in an agile methodology, the system comprising:
 a memory storing program instructions;
 a processor executing program instructions stored in the memory and configured to execute a task optimization engine configured to:
 receive, via one or more Application Programming Interfaces (APIs), input data from one or more Application Lifecycle Management (ALM) tools, the input data comprising story point data associated with historical user stories captured during previous sprints, wherein the input data is analyzed to determine a first feature dataset;
 determine a reference threshold value associated with the story point data such that the first feature dataset corresponding to the story point data is in a pre-defined range;
 determine a second feature dataset from the input data, the second feature dataset comprises data values obtained based on the previous sprints;
 determine a third feature dataset by analyzing the second feature dataset to determine correlated axis values associated with the data values of the previous sprints to determine defect counts associated with the previous sprints;
 determine a timeseries dataset for forecasting unplanned task for upcoming sprint based on analysis of the input data associated with unplanned task of the previous sprints;
 determine a dataset associated with attributes based on the input data corresponding to the previous sprints for story point data of an upcoming sprint, wherein one of the attributes includes determining repeatable tasks within repeatable stories by employing a nested algorithm based-model, and wherein a similarity threshold parameter is employed such that clusters of user stories are formed and tasks associated with the user stories that are determined to be above the similarity threshold are marked employing clustering techniques; and
 combine the datasets to generate a persistent identifier for sprint capacity buffer data values to optimize sprint-based tasks in agile methodology, wherein the system is configured for optimizing sprint based tasks in agile methodology by reducing uncertainties and enhancing productivity.

2. The system as claimed in claim 1, wherein the task optimization engine that receives the input data from an input data unit, the input data unit is in communication with the ALM tools via the APIs.

3. The system as claimed in claim 1, wherein the task optimization engine comprises an estimation effort analysis unit configured to analyse the input data to determine the first feature dataset that represents efforts involved in executing story points employing Inter Quartile Range (IQR) value, lower or upper boundaries and outliers relating to tasks associated with the previous sprints, wherein any overlap in the IQR value of effort across story points indicates poor story point estimation that is visualised using box plots via a User Interface (UI).

4. The system as claimed in claim 3, wherein the estimation effort analysis unit determines the reference threshold value employing a statistical model, wherein the reference threshold value relates to completed user stories with story points such that an effort estimation is in the predetermined range of a standard deviation.

5. The system as claimed in claim 3, wherein the estimation effort analysis unit is configured to identify a story point drift towards a higher story point value or lower story point value, where the story point drifts towards the lower story point value indicates higher productivity and the story point drift towards higher story point indicates less productivity.

6. The system as claimed in claim 3, wherein the estimation effort analysis unit is configured to determine an overshoot value, wherein user story with the effort value that lies outside single standard deviation is marked as the overshoot value.

7. The system as claimed in claim 1, wherein the task optimization engine comprises a pre-processing unit configured to determine the second feature dataset, the second feature dataset comprises:
 first data values associated with new terms identified in user stories of an upcoming sprint that are not present in the previous sprint; second data values associated with number of user stories; third data values associated with number of developers; fourth data values associated with number of Quality Assurance (QA) personnel; fifth data values associated with complexity indicated by distribution of user stories across story points; sixth data values associated with module wise count of user stories; seventh data values associated with change in team members captured in terms of incremental change compared to the previous sprints, wherein the second feature data is configurable depending on data availability.

8. The system as claimed in claim 1, wherein the task optimization engine comprises a defect prediction unit configured to employ Principal Component Analysis (PCA) on the second feature dataset to identify the correlated axis values.

9. The system as claimed in claim 8, wherein the defect prediction unit is configured to execute a regression model employing a XGBoost regressor based technique to train the regression model based on the second feature dataset computed from the previous sprints along with the defect counts.

10. The system as claimed in claim 8, wherein the defect prediction unit is configured to compare user stories of an upcoming sprint with defect counts using cosine similarity and store comparison data as a fourth feature dataset.

11. The system as claimed in claim 8, wherein the defect prediction unit is configured to identify one or more attributes that contribute to defects, wherein the one or more attributes are identified via a correlation operation.

12. The system as claimed in claim 8, wherein the defect prediction unit is configured to compress the second feature dataset into a correlated feature dataset that is achieved via PCA analysis which enables deriving a new set of feature values that represent values from underlying features through use of eigen values and eigne vectors.

13. The system as claimed in claim 1, wherein the task optimization engine comprises a forecasting unit configured to determine the timeseries dataset for forecasting unplanned task for upcoming sprint and store as a fifth feature dataset.

14. The system as claimed in claim 13, wherein the forecasting unit is configured to execute a Generative Adaptive Model (GAM) on the input data for forecasting the unplanned task.

15. The system as claimed in claim 1, wherein the task optimization engine comprises a risk estimation unit configured to determine the attribute including velocity data that represents over allocation or under allocation at a team member level, wherein the velocity data is compared with story point data of the upcoming sprint and the comparison data is stored as a sixth feature dataset.

16. The system as claimed in claim 15, wherein the risk estimation unit is configured to determine the attribute including new user stories and store it as a seventh feature dataset, and wherein the new stories are identified by using One-Class SVM model, the model is trained on the user stories from the historical input data and anomalies found in the user stories in the upcoming sprint.

17. The system as claimed in claim 15, wherein the risk estimation unit is configured to execute named entity recognition on the input data to identify anomalies in user stories in the upcoming sprint using Natural Language Processing (NLP) technique and store it as an eight eighth feature dataset.

18. The system as claimed in claim 15, wherein the risk estimation unit is configured to identify revision history of user stories received from the input data to verify if a story description or title or acceptance criteria is updated between a time it was created and assigned to the upcoming sprint, and wherein stories with the updates are flagged as at risk of being left incomplete.

19. The system as claimed in claim 1, wherein the task optimization engine comprises an identification unit configured to store data related to the repeatable tasks as a ninth feature dataset.

20. A method for optimizing sprint-based tasks implemented in an agile methodology, the method comprising steps of:
receiving, via one or more Application Programming Interfaces (APIs), input data from one or more Application Lifecycle Management (ALM) tools, the input data comprising story point data associated with historical user stories captured during previous sprints, wherein the input data is analyzed to determine a first feature dataset;
determining a reference threshold value associated with the story point data such that the first feature dataset corresponding to the story point data is in a pre-defined range;
determining a second feature dataset from the input data, the second feature dataset comprises data values obtained based on the previous sprints;
determining a third feature dataset by analyzing the second feature dataset to determine correlated axis values associated with the data values of the previous sprints to determine defect counts associated with the previous sprints;
determining a timeseries dataset for forecasting unplanned task for upcoming sprint based on analysis of the input data associated with unplanned task of the previous sprints;
determining a dataset associated with attributes based on the input data associated with the previous sprints for story point data of an upcoming sprint, wherein one of the attributes includes determining repeatable tasks within repeatable stories by employing a nested algorithm based-model, and wherein a similarity threshold parameter is employed such that clusters of user stories are formed and tasks associated with the user stories that are determined to be above the similarity threshold are marked employing clustering techniques; and
combining the datasets to generate a persistent identifier for sprint capacity buffer data values to optimize sprint-based tasks in agile methodology, wherein the system is configured for optimizing sprint based tasks in agile methodology by reducing uncertainties and enhancing productivity.

21. The method as claimed in claim 20, wherein the input data is received from an input data unit 102, the input data unit 102 is in communication with the ALM tools via the APIs.

22. The method as claimed in claim 20, wherein the step of receiving the input data comprises:
analysing the input data to determine the first feature dataset that represents efforts involved in executing story points employing Inter Quartile Range (IQR) value, lower or upper boundaries and outliers relating to tasks associated with the previous sprints, wherein overlap in the IQR value of effort across story points indicates poor story point estimation that is visualised using box plots via a User Interface (UI).

23. The method as claimed in claim 20, wherein the step of determining the reference threshold value comprises:
determining the reference threshold value employing a statistical model, wherein the reference threshold value relates to completed user stories with story points such that an effort estimation is in a predetermined range of a standard deviation.

24. The method as claimed in claim 20, wherein the method comprises the step of:
identifying story point drift towards a higher story point value or lower story point value, where the story point drift towards the lower story point value indicates higher productivity and the story point drift towards higher story point indicates less productivity.

25. The method as claimed in claim 20, wherein the method comprises the step of:
determining an overshoot value, wherein user story with an effort value that lies outside single standard deviation is marked as the overshoot value.

26. The method as claimed in claim 20, wherein determining the second feature dataset comprises the steps of:
determining the second feature dataset comprising first data values associated with new terms identified in user stories of an upcoming sprint that are not present in the previous sprint; second data values associated with number of user stories; third data values associated with number of developers; fourth data values associated with number of Quality Assurance (QA) personnel; fifth data values associated with complexity indicated by distribution of user stories across story points; sixth data values associated with module wise count of user stories; seventh data values associated with change in team members captured in terms of incremental change compared to the previous sprints, wherein the second feature data is configurable depending on data availability; and employing Principal Component Analysis (PCA) on the second feature dataset to identify the correlated axis values.

27. The method as claimed in claim 26, wherein the method comprises the step of:
executing a regression model employing a XGBoost regressor based technique to train the regression model based on the second feature dataset computed from the previous sprints along with the defect counts.

28. The method as claimed in claim 20, wherein the method comprises the step of:
comparing user stories of an upcoming sprint with the defect counts using cosine similarity and store the comparison data as a fourth feature dataset.

29. The method as claimed in claim 20, wherein the method comprises the step of:
identifying one or more attributes that contribute to defects, wherein the one or more attributes are identified via a correlation operation.

30. The method as claimed in claim 20, wherein the method comprises the step of:
compressing the second feature dataset into a correlated feature dataset via PCA analysis which enables deriving at a new set of feature values that represent values from underlying features through use of eigen values and eigne vectors.

31. The method as claimed in claim 20, wherein determining the timeseries dataset comprises the step of storing the timeseries dataset as a fifth feature dataset.

32. The method as claimed in claim 20, wherein determining the timeseries dataset for forecasting the unplanned task for the upcoming sprint comprises executing a Generative Adaptive Model (GAM) on the input data for forecasting the unplanned task.

33. The method as claimed in claim 20, wherein determining the dataset associated with attributes based on the input data comprises the step of:
determining the attributes including velocity data that represents over allocation or under allocation at a team member level, wherein the velocity data is compared with story point data of the upcoming sprint and the comparison data is stored as a sixth feature dataset.

34. The method as claimed in claim 20, wherein determining the dataset associated with attributes based on the input data comprises steps of:
determining the attributes including new user stories and storing it as a seventh feature dataset, and wherein new stories are identified by using One-Class SVM model, the model is trained on the user stories from the historical input data and anomalies found in the user stories in the upcoming sprint.

35. The method as claimed in claim 20, wherein determining the dataset associated with attributes based on the input data comprises the step of:
executing named entity recognition on the input data to identify anomalies in user stories in the upcoming sprint using Natural Language Processing (NLP) technique and store it as an eighth feature dataset.

36. The method as claimed in claim 20, wherein determining the dataset associated with attributes based on the input data comprises the step of:
identifying revision history of user stories received from the input data to verify if a story description or title or acceptance criteria is updated between a time it was created and assigned to the upcoming sprint, and wherein stories with the updates are flagged as at risk of being left incomplete.

37. The method as claimed in claim 20, wherein determining the dataset associated with attributes based on the input data comprises the step of:
storing data related to the repeatable tasks as a ninth feature dataset.

38. A computer program product comprising:
a non-transitory computer-readable medium having computer program code stored thereon, the computer-readable program code comprising instructions that, when executed by a processor, causes the processor to:
receive, via one or more Application Programming Interfaces (APIs), input data from one or more Application Lifecycle Management (ALM) tools, the input data comprising story point data associated with historical user stories captured during previous sprints, wherein the input data is analyzed to determine a first feature dataset;
determine a reference threshold value associated with the story point data such that the first feature dataset corresponding to the story point data is in a pre-defined range;
determine a second feature dataset from the input data, the second feature dataset comprises data values obtained based on the previous sprints;
determine a third feature dataset by analyzing the second feature dataset to determine correlated axis values associated with the data values of the previous sprints to determine defect counts associated with the previous sprints;
determine a timeseries dataset for forecasting unplanned task for upcoming sprint based on analysis of the input data associated with unplanned task of the previous sprints;
determine a dataset associated with attributes based on the input data corresponding to the previous sprints for story point data of an upcoming sprint, wherein one of the attributes includes determining repeatable tasks within repeatable stories by employing a nested algorithm based-model, and wherein a similarity threshold parameter is employed such that clusters of user stories are formed and tasks associated with the user stories that are determined to be above the similarity threshold are marked employing clustering techniques; and
combine the datasets to generate a persistent identifier for sprint capacity buffer data values to optimize sprint-based tasks in agile methodology.

* * * * *